US012725549B2

(12) United States Patent
Su et al.

(10) Patent No.: US 12,725,549 B2
(45) Date of Patent: Sep. 1, 2026

(54) ELECTRONIC DEVICE

(71) Applicant: Innolux Corporation, Miaoli County (TW)

(72) Inventors: Wei-Yu Su, Miaoli County (TW); Jui-Feng Ko, Miaoli County (TW); Geng-Fu Chang, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 19/062,030

(22) Filed: Feb. 25, 2025

(65) Prior Publication Data

US 2025/0308424 A1 Oct. 2, 2025

(30) Foreign Application Priority Data

Mar. 26, 2024 (CN) ......................... 202410353048.4

(51) Int. Cl.
*G09G 3/20* (2006.01)

(52) U.S. Cl.
CPC ....... *G09G 3/20* (2013.01); *G09G 2310/0291* (2013.01)

(58) Field of Classification Search
CPC ............. G09G 3/20; G09G 2310/0291; G09G 3/3266; G09G 3/32; G09G 3/3208; G09G 3/36
See application file for complete search history.

(56) References Cited

U.S. PATENT DOCUMENTS 8,300,033 B2 * 10/2012 Nam .................... G09G 3/3611 345/204
9,818,350 B2 * 11/2017 Sohn ........................ G09G 3/36
9,978,728 B2 5/2018 Lin et al.
10,084,147 B2 9/2018 Liu et al.
10,304,813 B2 5/2019 Kuo et al.
10,445,284 B2 * 10/2019 Chen ..................... G06F 1/3253
10,886,260 B2 1/2021 Kuo
11,342,319 B2 5/2022 Lin et al.
11,515,271 B2 11/2022 Hosaka
11,537,015 B2 12/2022 Kuo
11,658,262 B1 5/2023 Cheng et al.
11,658,276 B2 5/2023 Huang et al.
11,699,690 B2 7/2023 Shih et al.
(Continued)

FOREIGN PATENT DOCUMENTS

TW 200905636 2/2009

*Primary Examiner* — Grant Sitta
(74) *Attorney, Agent, or Firm* — JCIPRNET

(57) ABSTRACT

An electronic device is provided. The electronic device includes an electronic panel, a plurality of signal drivers, and a controller. The electronic panel includes a plurality of signal lines. The signal lines are divided into a plurality of signal line groups. The signal drivers are electrically connected to the signal line groups respectively. Two adjacent ones of the signal drivers are electrically connected to each other. The controller transmits a clock embedded digital signal to a first-level signal driver in the signal drivers. The signal drivers use point-to-point connection to sequentially transmit the clock embedded digital signal from the first-level signal driver to an $N^{th}$-level signal driver in the signal drivers in a cascade manner, where N is greater than 1.

18 Claims, 10 Drawing Sheets

(56) References Cited

U.S. PATENT DOCUMENTS

| | | | | |
|---|---|---|---|---|
| 2006/0202938 | A1* | 9/2006 | Chen | G09G 3/3685 345/100 |
| 2006/0232579 | A1* | 10/2006 | Chen | G09G 3/3611 345/211 |
| 2007/0216630 | A1* | 9/2007 | Liao | G09G 3/20 345/100 |
| 2008/0036957 | A1* | 2/2008 | Hsu | G09G 3/20 349/151 |
| 2008/0094336 | A1 | 4/2008 | Hsu | |
| 2010/0007596 | A1* | 1/2010 | Cho | G09G 3/20 345/98 |
| 2010/0225637 | A1* | 9/2010 | Jeon | G09G 3/20 345/213 |
| 2011/0181558 | A1* | 7/2011 | Jeon | G09G 3/3611 345/204 |
| 2011/0199369 | A1 | 8/2011 | Huang et al. | |
| 2012/0056870 | A1* | 3/2012 | Koh | G09G 3/3688 345/215 |
| 2018/0336828 | A1* | 11/2018 | Chen | G02F 1/13452 |
| 2019/0041701 | A1 | 2/2019 | Chen et al. | |
| 2020/0020271 | A1 | 1/2020 | Watsuda | |
| 2021/0241700 | A1* | 8/2021 | Kwon | G09G 3/3275 |
| 2022/0254305 | A1* | 8/2022 | Yeh | G09G 3/32 |
| 2025/0273131 | A1* | 8/2025 | Park | G09G 3/32 |

* cited by examiner

ELECTRONIC DEVICE

CROSS-REFERENCE TO RELATED APPLICATION

This application claims the priority benefit of China application serial no. 202410353048.4, filed on Mar. 26, 2024. The entirety of the above-mentioned patent application is hereby incorporated by reference herein and made a part of this specification.

BACKGROUND

Technical Field

The disclosure relates to an electronic device, and particularly relates to an electronic device that transmits signals based on point-to-point connection.

Description of Related Art

A current electronic device may include a plurality of signal drivers and a controller. The plurality of signal drivers respectively drive some circuits or some pixels in the electronic device. The controller may use a point-to-point connection method to send a first driving signal to a first signal driver in the plurality of signal drivers, and send a second driving signal to a second signal driver in the plurality of signal drivers, and so on. However, the controller must transmit driving signals to each of the plurality of signal drivers. In addition, in view of a circuit design, a number of ports of the controller increases as a number of the signal drivers increases. Therefore, the cost of the controller will be increased.

SUMMARY

The disclosure is directed to an electronic device, which is adapted to reduce the cost of a controller of the electronic device.

An embodiment of the disclosure provides an electronic device including an electronic panel, a plurality of signal drivers, and a controller. The electronic panel includes a plurality of signal lines. The plurality of signal lines are divided into a plurality of signal line groups. The plurality of signal drivers are electrically connected to the plurality of signal line groups respectively. Two adjacent ones of the plurality of signal drivers are electrically connected to each other. The controller is electrically connected to a first-level signal driver in the plurality of signal drivers. The controller transmits a clock embedded digital signal to the first-level signal driver. The plurality of signal drivers use point-to-point connection to sequentially transmit the clock embedded digital signal from the first-level signal driver to an $N^{th}$-level signal driver in the plurality of signal drivers in a cascade manner, wherein N is greater than 1.

Based on the above description, the controller transmits the clock embedded digital signal to the first-level signal driver. In addition, the clock embedded digital signal is sequentially transmitted from the first-level signal driver to the $N^{th}$-level signal driver through point-to-point connections. It should be noted that the controller does not need to send a driving signal to each of the plurality of signal drivers. Therefore, a number of ports of the controller does not need to increase as the number of the signal drivers increases. Therefore, the cost of the controller is reduced.

DESCRIPTION OF THE EMBODIMENTS

Figure 1:
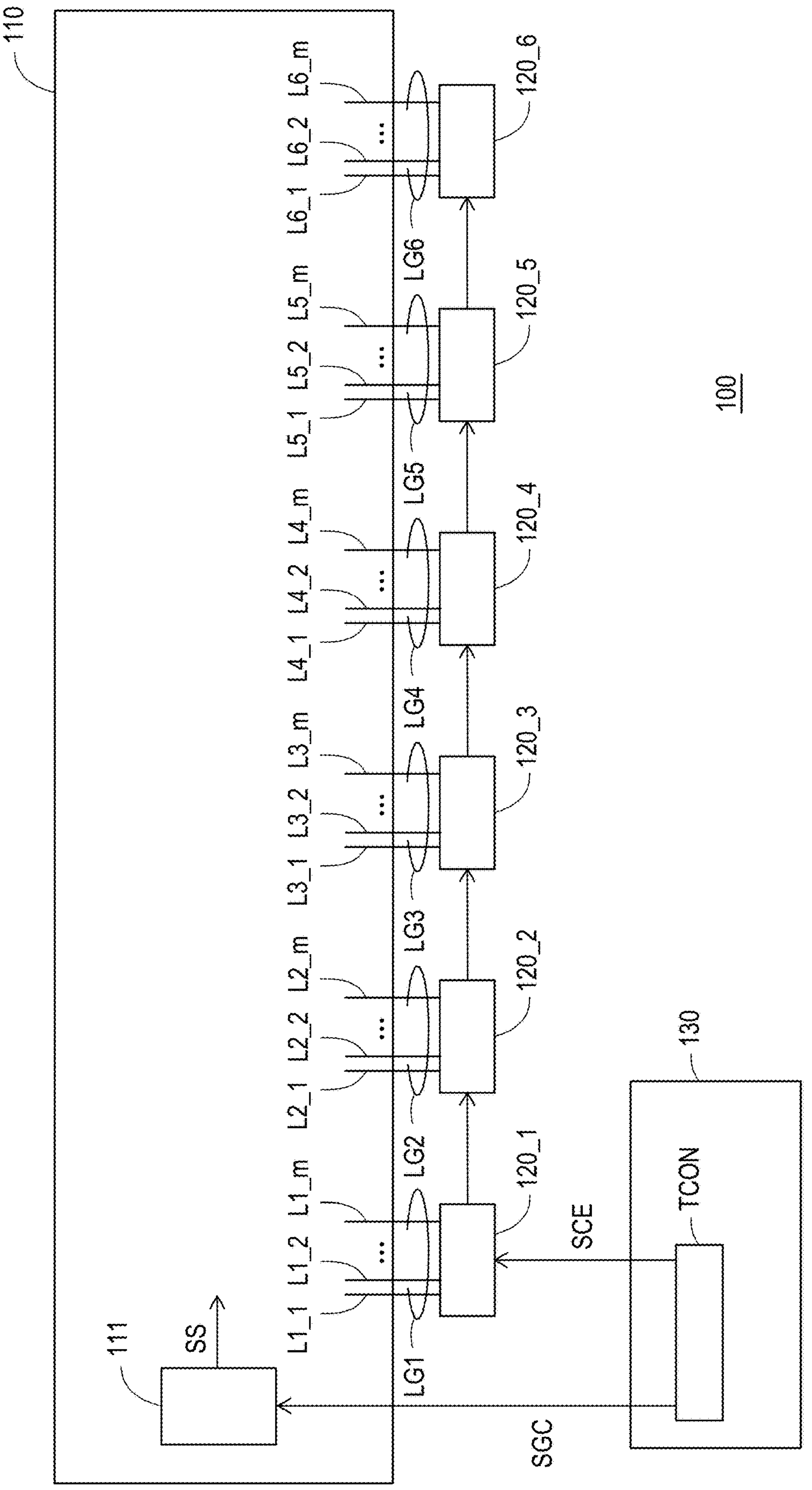
FIG. 1 is a schematic diagram of an electronic device according to an embodiment of the disclosure.

The disclosure may be understood from the following detailed description made with reference to the drawings as described below. It should be noted that, for purposes of clarity and easy understanding by readers, each drawing of the disclosure depicts a part of an electronic device, and some components in each drawing may not be drawn to scale. In addition, the number and size of each device depicted in the drawings are illustrative only and not intended to limit the scope of the disclosure.

Certain terms are used throughout the description and the following claims to refer to specific components. As will be understood by those skilled in the art, manufacturers of electronic equipment may refer to components by different names. This specification does not intend to distinguish between components that differ in name but not function. In the following description and in the claims, the terms "containing", "including" and "having" are used in an open manner and should therefore be construed as meaning "including but not limited to . . . " Therefore, when the terms "containing", "including", and/or "having" are used in the description of the disclosure, they specify existence of corresponding features, regions, steps, operations, and/or components, but do not exclude existence of one or more corresponding features, regions, steps, operations, and/or components.

It should be understood that when a component is referred to as being "coupled to", "connected to" or "conducted to" another component, the component may be directly connected to the other component and may directly establish an electrical connection, or there may be intermediate components there between for relaying electrical connection (indirect electrical connection). In contrast, when a component is referred to as being "directly coupled to," "directly connected to," or "directly connected to" another component, there are no intervening components present.

Although terms such as first, second, third, etc., may be used to describe various constituent components, such constituent components are not limited by these terms. The terms are used only to distinguish a constituent component from other constituent components in the specification. The claims may not use the same terms, but may use the terms first, second, third etc., with respect to a required order of the components. Therefore, in the following description, a first constituent component may be a second constituent component in the claims.

The electronic device of the disclosure may include a display device, an antenna device, a sensing device, a light-emitting device, a touch electronic device, a curved electronic device or a free shape electronic device, but the disclosure is not limited thereto. The electronic device may include a bendable or flexible electronic device. The electronic device may include, for example, liquid crystal, light-emitting diodes, quantum dots (QD), fluorescence, phosphor, other suitable display media, or a combination of the above materials, but the disclosure is not limited thereto. The light-emitting diode may include, for example, an organic light emitting diode (OLEDs), a mini LED, a micro LED or a quantum dot LED (QDLED), or other suitable materials, or a combination of the above, but the disclosure is not limited thereto. The display device may, for example, include a spliced display device, but the disclosure is not limited thereto. The antenna device may be, for example, a liquid crystal antenna, but the disclosure is not limited thereto. The antenna device may, for example, include an antenna splicing device, but the disclosure is not limited thereto. It should be noted that the electronic device may be any combination of the above, but is not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, etc., to support the display device, antenna device or splicing device, but the disclosure is not limited thereto. The sensing device may include a camera, an infrared sensor or a fingerprint sensor, etc., but the disclosure is not limited thereto. In some embodiments, the sensing device may further include a flash lamp, an infrared (IR) light source, other sensors, electronic elements, or a combination thereof, but the disclosure is not limited thereto.

In the disclosure, the embodiments use "pixel" or "pixel unit" as a unit for describing a specific region including at least one functional circuit for at least one specific function. A region of a "pixel" depends on the unit used to provide a particular function, and adjacent pixels may share the same parts or wires, but may also contain specific parts of themselves therein. For example, the adjacent pixels may share a same scan line or a same data line, but a pixel may also include at least one of its own transistors, capacitors, and at least one light-emitting diodes.

It should be noted that technical features in different embodiments described below may be replaced, reorganized or mixed with each other to form another embodiment without departing from the spirit of the disclosure.

Referring to FIG. 1, FIG. 1 is a schematic diagram of an electronic device according to an embodiment of the disclosure. In the embodiment, an electronic device 100 includes a first electronic panel 110, signal drivers 120_1-120_6, and a controller 130. The electronic device 100 may be a display device, but the disclosure is not limited thereto. In some embodiments, the first electronic panel 110 may be an antenna panel, a sensing panel, a light-emitting panel, a touch display panel, a curved display panel or a free shape display panel.

In the embodiment, the first electronic panel 110 includes signal lines L1_1-L1_*m*, L2_2-L2_*m*, L3_1-L3_*m*, L4_1-L4_*m*, L5_1-L5_*m*, L6_1-L6_*m*. The signal lines L1_1-L1_*m*, L2_2-L2_*m*, L3_1-L3_*m*, L4_1-L4_*m*, L5_1-L5_*m*, L6_1-L6_*m* are divided or grouped into signal line groups LG1-LG6. For example, the signal lines L1_1-L1_*m* are grouped into the signal line group LG1. The signal lines L2_2-L2_*m* are grouped into the signal line groups LG2, and so on. In the embodiment, the signal drivers 120_1 to 120_6 are respectively used to drive at least one corresponding circuit or at least one corresponding pixel in the first electronic panel 110.

In the embodiment, two adjacent ones of the signal drivers 120_1 to 120_6 are electrically connected to each other. In other words, the signal drivers 120_1-120_6 are electrically connected in series.

In the embodiment, the controller 130 is electrically connected to the signal driver 120_1. The controller 130 transmits a clock embedded digital signal SCE to the signal driver 120_1. The signal drivers 120_1-120_6 transmit the clock embedded digital signal SCE sequentially from the signal driver 120_1 (i.e., the first-level signal driver) to the signal driver 120_6 (i.e., a sixth-level signal driver) in the plurality of signal drivers through point-to-point connections in a cascade manner.

It should be noted that the controller 130 transmits the clock embedded digital signal SCE to the signal driver 120_1. In addition, the clock embedded digital signal SCE is sequentially transmitted from the signal driver 120_1 to the signal driver 120_6 through point-to-point connection. It should be noted that the controller 130 does not need to send different driving signals to each of the signal drivers 120_1-120_6. Therefore, the ports of the controller 130 do not need to increase as the number of the signal drivers 120_1 to 120_6 increases. Therefore, the cost of the controller 130 is reduced. In addition, a workload of the controller 130 may be reduced.

For ease of explanation, the number of the signal drivers 120_1 to 120_6 in the embodiment is, for example, 6, but the disclosure is not limited thereto. The number of the signal drivers of the disclosure may be plural.

In the embodiment, the clock embedded digital signal SCE is a differential signal. Therefore, the clock embedded digital signal SCE is less susceptible to electromagnetic interference (EMI), electrostatic discharge (ESD), etc.

In the embodiment, the signal drivers 120_1-120_6 respectively include a source driving circuit. The signal drivers 120_1 to 120_6 respectively provide data according to the clock embedded digital signal SCE, and use the data to drive corresponding circuits or corresponding pixels in the first electronic panel 110.

In the embodiment, the first electronic panel 110 further includes a gate driver 111. The controller 130 is electrically connected to the gate driver 111. The controller 130 transmits a gate control signal SGC to the gate driver 111. The gate driver 111 may provide a scan signal SS according to the gate control signal SGC.

In the embodiment, the controller 130 includes a timing controller TCON. The timing controller TCON generates the clock embedded digital signal SCE and the gate control signal SGC.

Figure 2:
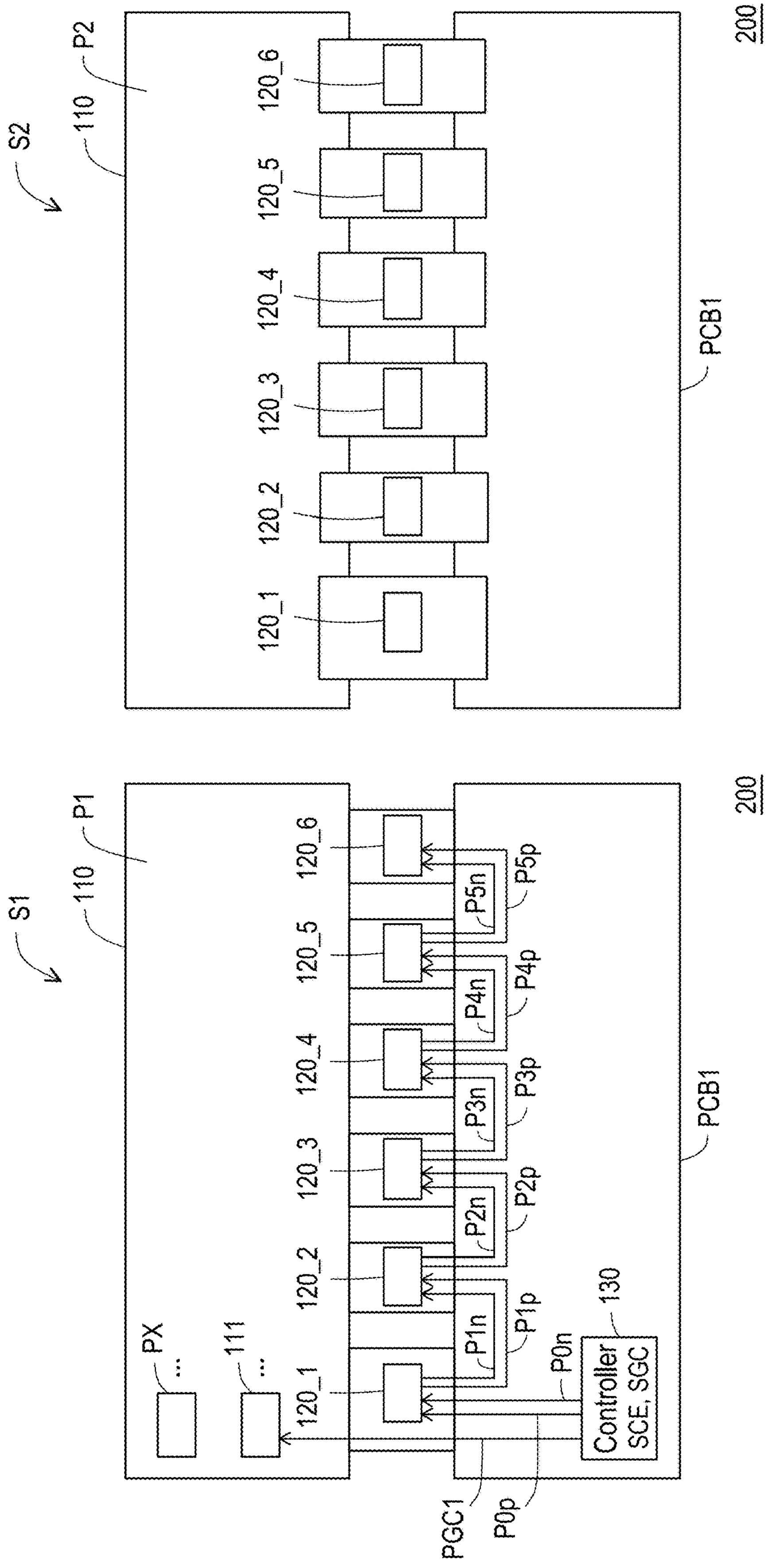
FIG. 2 is a schematic diagram of an electronic device according to an embodiment of the disclosure.

Referring to FIG. 2, FIG. 2 is a schematic diagram of an electronic device according to an embodiment of the disclosure. FIG. 2 shows a first side schematic view S1 of an electronic device 200 and a second side schematic view S2 of the electronic device 200. In the embodiment, the electronic device 200 includes the first electronic panel 110, the signal drivers 120_1-120_6, and the controller 130. The controller 130 is disposed on a circuit board PCB1. The signal drivers 120_1-120_6 are electrically connected to the circuit board PCB1 through any form of chip-on-film (COF)

packaging. Two adjacent ones of the signal drivers 120_1-120_6 are electrically connected to each other through traces on the circuit board PCB1.

In the embodiment, the circuit board PCB1 includes traces P0*n*-P5*n*, P0*p*-P5*p*, and PGC1. The traces P0*n* and P0*p* are regarded as a differential trace pair. The traces P1*n*, P1*p* are regarded as another differential trace pair, and so on. The controller 130 is electrically connected to the signal driver 120_1 through the traces P0*n* and P0*p*, and provides the clock embedded digital signal SCE to the signal driver 120_1 through the traces P0*n* and P0*p*. Two adjacent ones of the signal drivers 120_1 to 120_6 are electrically connected through the differential trace pairs. The signal driver 120_1 transmits the clock embedded digital signal SCE to the signal driver 120_2 through the traces P1*n* and P1*p*. The signal driver 120_2 transmits the clock embedded digital signal SCE to the signal driver 120_3 through the traces P2*n* and P2*p*, and so on.

In the embodiment, the first electronic panel 110 includes a plurality of pixels PX and a gate driver 111. The pixels PX are disposed on a first surface P1 of the first electronic panel 110. The signal drivers 120_1 to 120_6 are electrically connected between a second surface P2 of the first electronic panel 110 and the circuit board PCB1 through COF packaging. The second surface P2 is opposite to the first surface P1. The signal lines of the first electronic panel 110 (for example, the signal lines L1_1-L1_*m*, L2_2-L2_*m*, L3_1-L3_*m*, L4_1-L4_*m*, L5_1-L5_*m*, L6_1-L6_*m* in FIG. 1) may be electrically connected to one of the signal drivers 120_1 to 120_6 through a through-hole connection structure or a sidewall connection structure. Therefore, the first electronic panel 110 may maintain a larger active area.

The controller 130 provides the gate control signal SGC to the gate driver 111 through the trace PGC1 of the circuit board PCB1 and the trace in the COF of the signal driver 120_1. In the embodiment, the gate driver 111 may provide a scan signal (for example, the scan signal SS of FIG. 1) to at least one of the plurality of pixels PX. In some embodiments, the first electronic panel 110 includes a plurality of gate drivers 111. Each of the plurality of gate drivers 111 provides the scan signal to a corresponding pixel row. In some embodiments, the first electronic panel 110 includes a plurality of gate drivers 111. Each of the plurality of gate drivers 111 provides the scan signal to a corresponding pixel row. In some embodiments, the first electronic panel 110 includes a single gate driver 111. The gate driver 111 provides the scan signals to different pixel rows sequentially or simultaneously.

Figure 3:
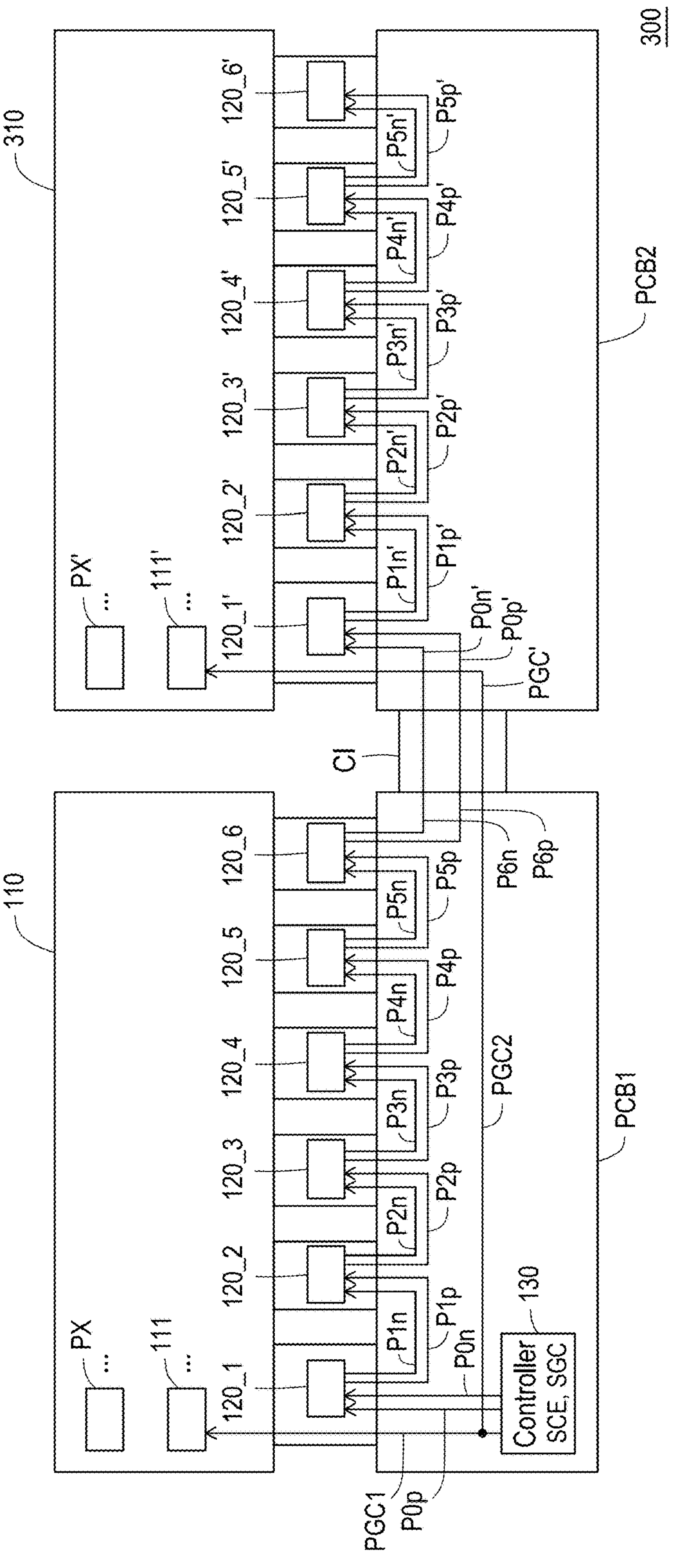
FIG. 3 is a schematic diagram of an electronic device according to an embodiment of the disclosure.

Referring to FIG. 3, FIG. 3 is a schematic diagram of an electronic device according to an embodiment of the disclosure. In the embodiment, an electronic device 300 is a splicing device. The electronic device 300 includes the first electronic panel 110, a second electronic panel 310, signal drivers 120_1-120_6, 120_1'-120_6', a controller 130, and circuit boards PCB1 and PCB2. The first electronic panel 110, the signal drivers 120_1 to 120_6, the controller 130 and implementations thereof have been clearly explained in the embodiment of FIG. 2, so that details thereof are not repeated.

In the embodiment, the circuit board PCB1 is electrically connected to the circuit board PCB2 through a signal transmission interface CI. The signal driver 120_6 transmits the clock embedded digital signal SCE to the circuit board PCB2 through the circuit board PCB1 and the signal transmission interface CI. In addition, the controller 130 transmits the gate control signal SGC to the circuit board PCB2 through the circuit board PCB1 and the signal transmission interface CI.

In the embodiment, the signal transmission interface CI may be any form of bus or signal transmission cable. The signal transmission cable is, for example, a coaxial cable.

In the embodiment, the signal drivers 120_1'-120_6' are electrically connected between the circuit board PCB2 and the second electronic panel 310 through COF packaging. The circuit board PCB2 includes traces P0*n*'-P5*n*', P0*p*'-P5*p*', and PGC'. The second electronic panel 310 includes a plurality of pixels PX' and a gate driver 111'. The signal driver 120_6 is electrically connected to the signal driver 120_1' through the traces P6*n* and P6*p* of the circuit board PCB1, the signal transmission interface CI and the traces P0*n*' and P0*p*' of the circuit board PCB2. The signal driver 120_6 provides the clock embedded digital signal SCE to the signal driver 120_1' through the traces P6*n* and P6*p* of the circuit board PCB1, the signal transmission interface CI and the traces P0*n*' and P0*p*' of the circuit board PCB2. The signal driver 120_1' transmits the clock embedded digital signal SCE to the signal driver 120_2' through the traces P1*n*' and P1*p*'. The signal driver 120_2' transmits the clock embedded digital signal SCE to the signal driver 120_3' through the traces P2*n*' and P2*p*', and so on.

The controller 130 provides the gate control signal SGC to the gate driver 111' through the trace PGC2 of the circuit board PCB1, the signal transmission interface CI, the trace PGC' of the circuit board PCB2, and the traces in the COF of the signal driver 120_1'. In the embodiment, the gate driver 111' may provide a scan signal (such as the scan signal SS of FIG. 1) to at least one of the plurality of pixels PX'. In some embodiments, the second electronic panel 310 includes a plurality of gate drivers 111'. Each of the plurality of gate drivers 111' provides the scan signal to a corresponding pixel row. In some embodiments, the second electronic panel 310 includes a plurality of gate drivers 111'. Each of the plurality of gate drivers 111' provides the scan signal to a corresponding pixel row. In some embodiments, the first electronic panel 110 includes a single gate driver 111. The gate driver 111 provides the scanning signal to different pixel rows sequentially or simultaneously.

Figure 5:
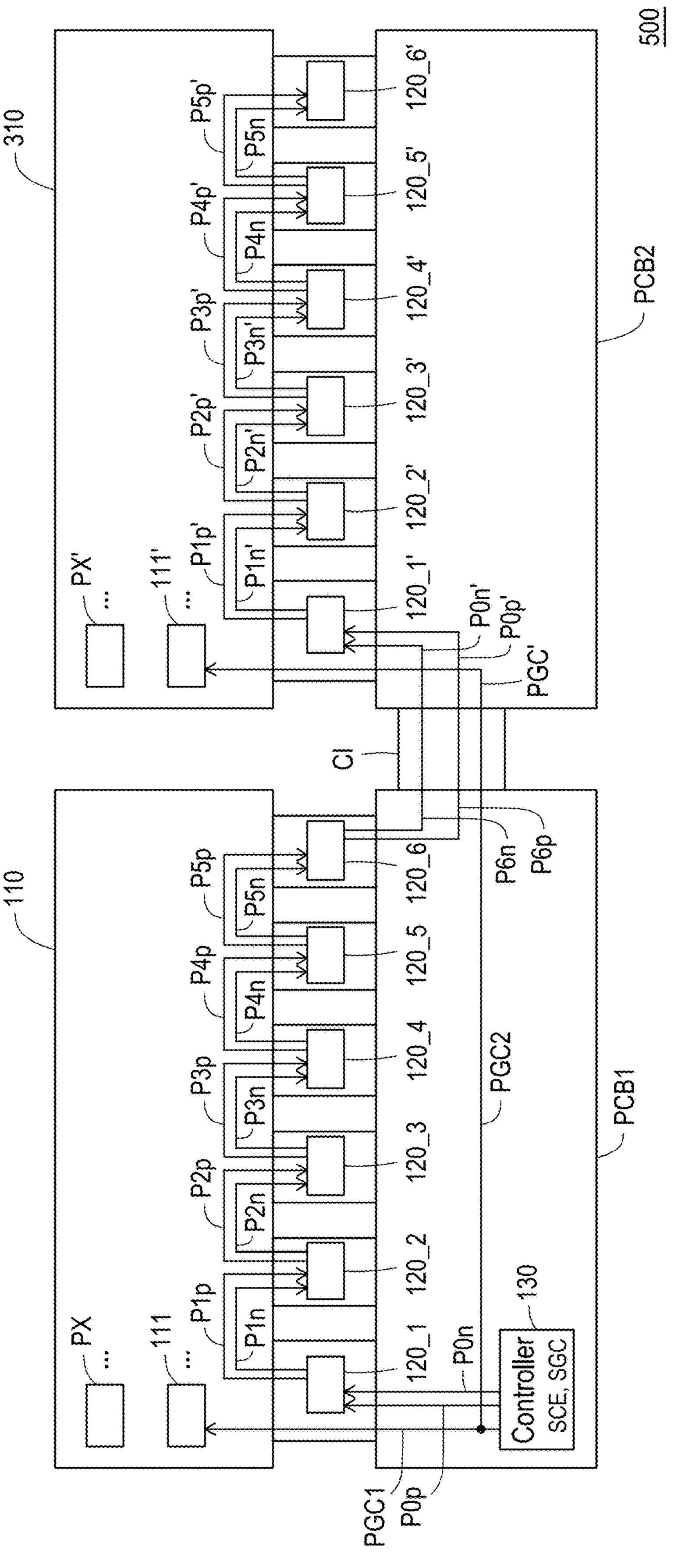
FIG. 5 is a schematic diagram of an electronic device according to an embodiment of the disclosure.
Figure 7:
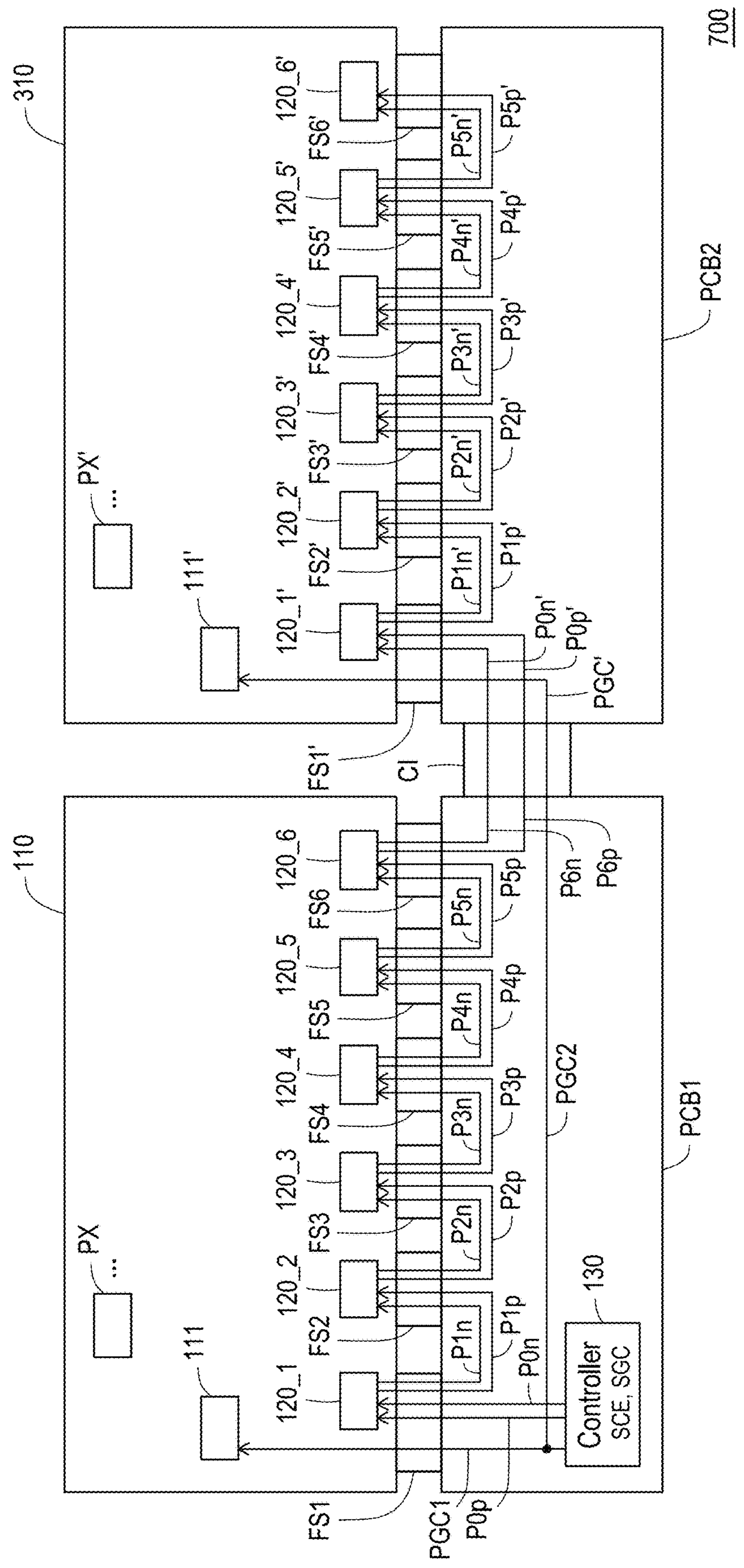
FIG. 7 is a schematic diagram of an electronic device according to an embodiment of the disclosure.
Figure 9:
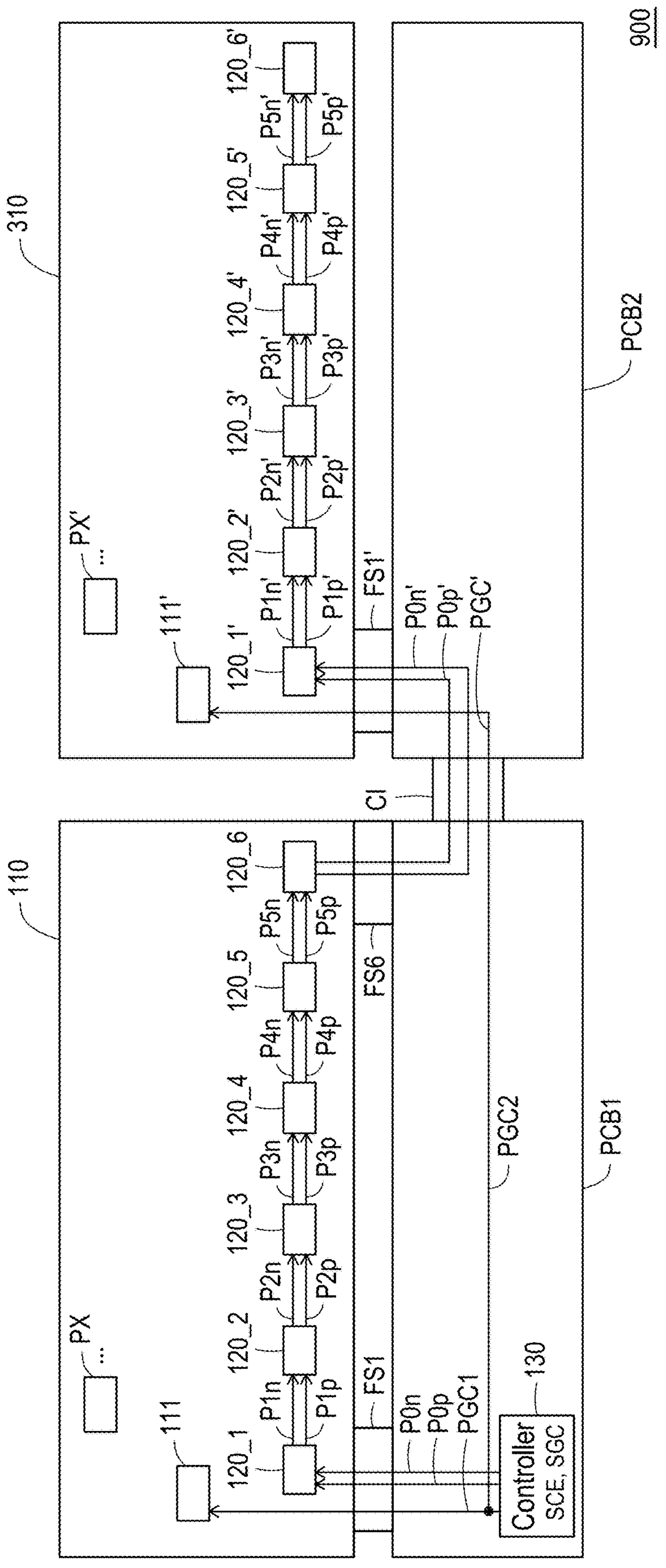
FIG. 9 is a schematic diagram of an electronic device according to an embodiment of the disclosure.

In some embodiments, implementation patterns of the second electronic panel 310, the signal drivers 120_1'-120_6', and the circuit board PCB2 may be implemented as one of the implementation patterns of FIG. 5, FIG. 7, and FIG. 9.

Figure 4:
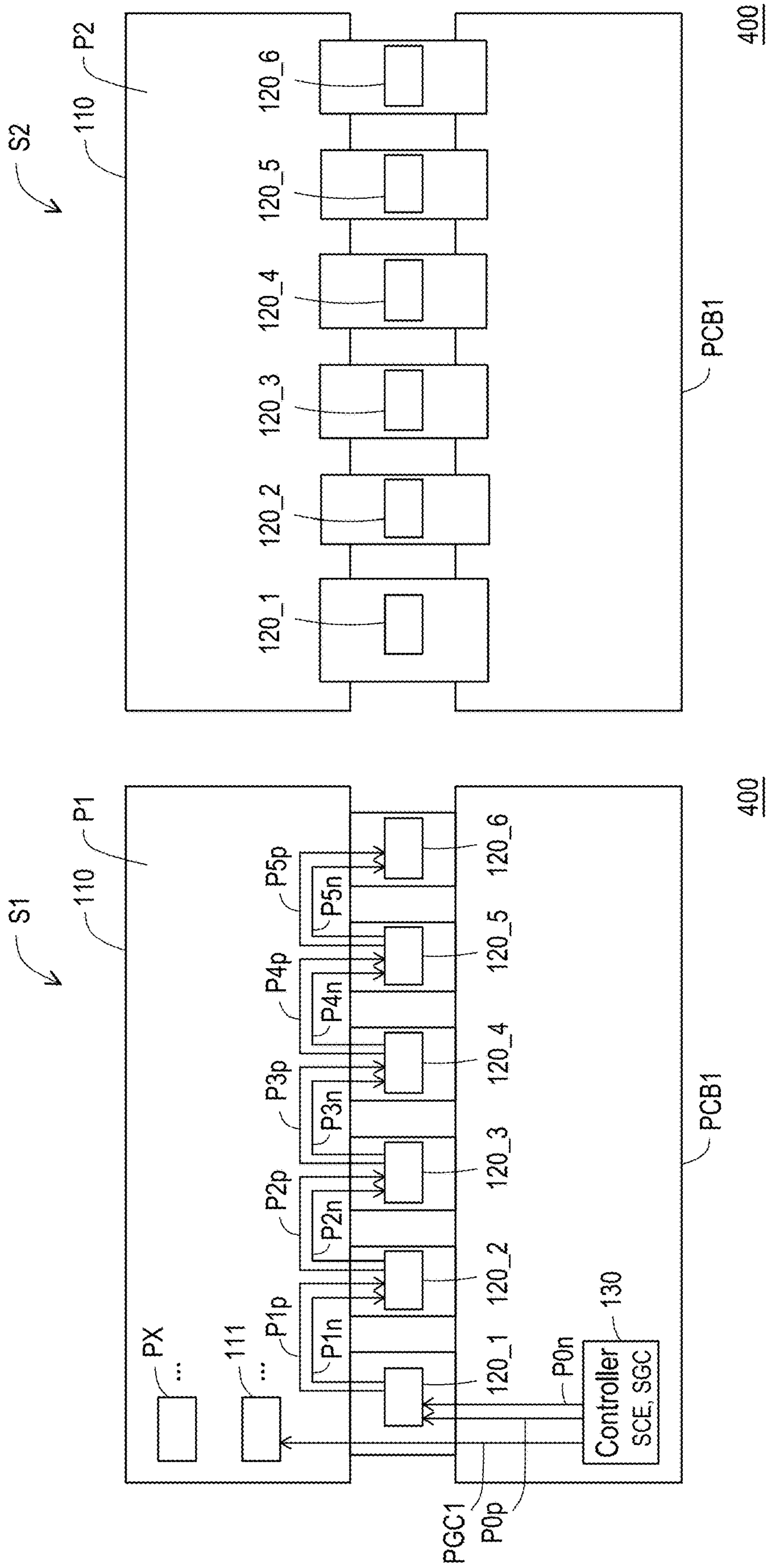
FIG. 4 is a schematic diagram of an electronic device according to an embodiment of the disclosure.

Referring to FIG. 4, FIG. 4 is a schematic diagram of an electronic device according to an embodiment of the disclosure. FIG. 4 shows a first side schematic view S1 of an electronic device 400 and a second side schematic view S2 of the electronic device 200. In the embodiment, the electronic device 400 includes the first electronic panel 110, the signal drivers 120_1-120_6, and the controller 130. The controller 130 is disposed on the circuit board PCB1. The signal drivers 120_1-120_6 are electrically connected to the circuit board PCB1 through COF packaging. Two adjacent ones of the signal drivers 120_1 to 120_6 are electrically connected to each other through the traces on the first electronic panel 110.

In the embodiment, the circuit board PCB1 includes traces P0*n*, P0*p*, and PGC1. The first electronic panel 110 includes traces P1*n*-P5*n*, P1*p*-P5*p*, PGC1, the plurality of pixels PX, and the gate driver 111. The controller 130 is electrically connected to the signal driver 120_1 through the traces P0*n* and P0*p*, and provides the clock embedded digital signal SCE to the signal driver 120_1 through the traces P0*n* and P0*p*. Two adjacent ones of the signal drivers 120_1 to 120_6 are electrically connected through differential trace pairs. The signal driver 120_1 transmits the clock embedded digital signal SCE to the signal driver 120_2 through the traces P1*n* and P1*p*. The signal driver 120_2 transmits the clock embedded digital signal SCE to the signal driver 120_3 through the traces P2*n* and P2*p*, and so on.

In the embodiment, the pixel PX is disposed on the first surface P1 of the first electronic panel 110. The signal drivers 120_1 to 120_6 are electrically connected between the second surface P2 of the first electronic panel 110 and the circuit board PCB1 through COF packaging. The signal lines of the first electronic panel 110 may be electrically connected to one of the signal drivers 120_1 to 120_6 through a through-hole connection structure or a sidewall connection structure. Therefore, the first electronic panel 110 may maintain a larger active area.

In the embodiment, the controller 130 provides the gate control signal SGC to the gate driver 111 through the trace PGC1 of the circuit board PCB1 and the traces in the COF of the signal driver 120_1.

Referring to FIG. 5, FIG. 5 is a schematic diagram of an electronic device according to an embodiment of the disclosure. In the embodiment, an electronic device 500 is a splicing device. The electronic device 500 includes the first electronic panel 110, the second electronic panel 310, the signal drivers 120_1-120_6, 120_1'-120_6', the controller 130, and the circuit boards PCB1 and PCB2. The first electronic panel 110, the signal drivers 120_1 to 120_6, the controller 130 and the implementation method thereof have been clearly explained in the embodiment of FIG. 4, so that details thereof are not repeated here.

In the embodiment, the circuit board PCB1 is electrically connected to the circuit board PCB2 through the signal transmission interface CI. The signal driver 120_6 transmits the clock embedded digital signal SCE to the circuit board PCB2 through the circuit board PCB1 and the signal transmission interface CI. In addition, the controller 130 transmits the gate control signal SGC to the circuit board PCB2 through the circuit board PCB1 and the signal transmission interface CI.

In the embodiment, the signal drivers 120_1'-120_6' are electrically connected between the circuit board PCB2 and the second electronic panel 310 through COF packaging. The circuit board PCB2 includes traces P0*n*', P0*p*', and PGC'. The second electronic panel 310 includes traces P1*n*'-P5*n*', P1*p*'-P5*p*', a plurality of pixels PX' and a gate driver 111'. The signal driver 120_6 is electrically connected to the signal driver 120_1' through the traces P6*n* and P6*p* of the circuit board PCB1, the signal transmission interface CI and the traces P0*n*' and P0*p*' of the circuit board PCB2. The signal driver 120_6 provides the clock embedded digital signal SCE to the signal driver 120_1' through the traces P6*n* and P6*p* of the circuit board PCB1, the signal transmission interface CI and the traces P0*n*' and P0*p*' of the circuit board PCB2. The signal driver 120_1' transmits the clock embedded digital signal SCE to the signal driver 120_2' through the traces P1*n*' and P1*p*'. The signal driver 120_2' transmits the clock embedded digital signal SCE to the signal driver 120_3' through the traces P2*n*' and P2*p*', and so on.

The controller 130 provides the gate control signal SGC to the gate driver 111' through the trace PGC2 of the circuit board PCB1, the signal transmission interface CI, the trace PGC' of the circuit board PCB2, and the traces in the COF of the signal driver 120_1'.

In some embodiments, the implementation patterns of the second electronic panel 310, the signal drivers 120_1'-120_6', and the circuit board PCB2 may be implemented as one of the implementation patterns of FIG. 3, FIG. 7, and FIG. 9.

Figure 6:
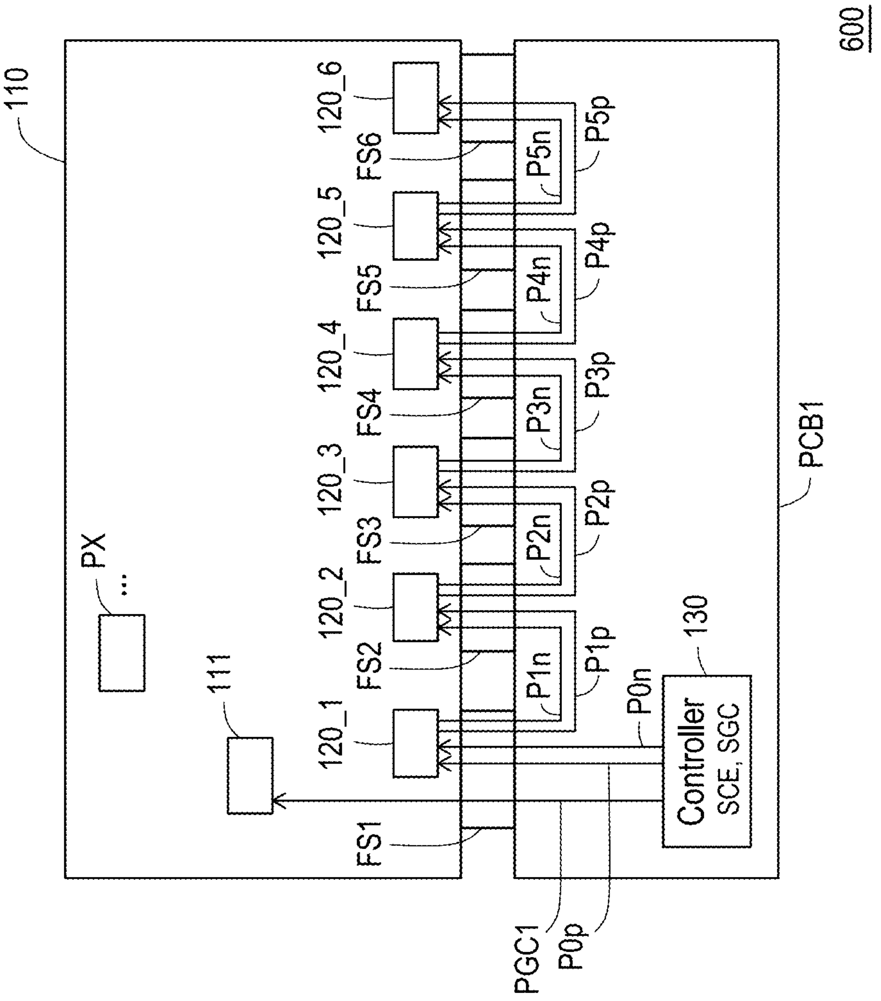
FIG. 6 is a schematic diagram of an electronic device according to an embodiment of the disclosure.

Referring to FIG. 6, FIG. 6 is a schematic diagram of an electronic device according to an embodiment of the disclosure. In the embodiment, an electronic device 600 includes the first electronic panel 110, the signal drivers 120_1-120_6, and the controller 130. The controller 130 is disposed on the circuit board PCB1. The signal drivers 120_1-120_6 are disposed on the first electronic panel 110. Two adjacent ones of the signal drivers 120_1 to 120_6 are electrically connected to each other through a flat cable structure and the traces on the circuit board PCB1.

In the embodiment, the circuit board PCB1 is electrically connected to the signal drivers 120_1-120_6 through flat cable structures FS1-FS6. The circuit board PCB1 includes traces P0*n*-P5*n*, P0*p*-P5*p*, and PGC1. The controller 130 is electrically connected to the signal driver 120_1 through the traces P0*n*, P0*p* and the flat cable structure FS1, and provides the clock embedded digital signal SCE to the signal driver 120_1 through the traces P0*n*, P0*p* and the flat cable structure FS1. The signal driver 120_1 transmits the clock embedded digital signal SCE to the signal driver 120_2 through the flat cable structure FS1, the traces P1*n*, P1*p* and the flat cable structure FS2. The signal driver 120_2 transmits the clock embedded digital signal SCE to the signal driver 120_3 through the flat cable structure FS2, the traces P2*n*, P2*p* and the flat cable structure FS3, and so on.

In addition, the controller 130 provides the gate control signal SGC to the gate driver 111 through the trace PGC1 of the circuit board PCB1 and the flat cable structure FS1.

In the embodiment, the flat cable structures FS1-FS6 may be flexible flat cable (FFC) components, but the disclosure is not limited thereto.

Referring to FIG. 7, FIG. 7 is a schematic diagram of an electronic device according to an embodiment of the disclosure. In the embodiment, an electronic device 700 is a splicing device. The electronic device 300 includes the first electronic panel 110, the second electronic panel 310, the signal drivers 120_1-120_6, 120_1'-120_6', the controller 130, and the circuit boards PCB1 and PCB2. The first electronic panel 110, the signal drivers 120_1 to 120_6, the controller 130 and the implementation method thereof have been clearly explained in the embodiment of FIG. 6, so that details thereof are not be repeated here.

In the embodiment, the circuit board PCB1 is electrically connected to the circuit board PCB2 through the signal transmission interface CI. The signal driver 120_6 transmits the clock embedded digital signal SCE to the circuit board PCB2 through the circuit board PCB1 and the signal transmission interface CI. In addition, the controller 130 transmits the gate control signal SGC to the circuit board PCB2 through the circuit board PCB1 and the signal transmission interface CI.

In the embodiment, the signal drivers 120_1'-120_6' are disposed on the second electronic panel 310. The second electronic panel 310 includes a plurality of pixels PX' and a gate driver 111'. The circuit board PCB2 is electrically connected to the signal drivers 120_1'-120_6' through flat cable structures FS1'-FS6'. The circuit board PCB2 includes traces P0*n*'-P5*n*', P0*p*'-P5*p*', and PGC'. The signal driver 120_6 is electrically connected to the signal driver 120_1' through the flat cable structure FS6, the traces P6*n* and P6*p* of the circuit board PCB1, the signal transmission interface CI, the traces P0*n*' and P0*p*' of the circuit board PCB2, and the flat cable structure FS1'. The signal driver 120_6 provides the clock embedded digital signal SCE to the signal driver 120_1' through the flat cable structure FS6, the traces P6*n* and P6*p* of the circuit board PCB1, the signal transmission interface CI, the traces P0*n*' and P0*p*' of the circuit board PCB2, and the flat cable structure FS1'. The signal driver 120_1' transmits the clock embedded digital signal SCE to the signal driver 120_2' through the traces P1*n*' and P1*p*'. The signal driver 120_2' transmits the clock embedded digital signal SCE to the signal driver 120_3' through the traces P2*n*' and P2*p*', and so on.

The controller 130 provides the gate control signal SGC to the gate driver 111' through the trace PGC2 of the circuit board PCB1, the signal transmission interface CI, the trace PGC' of the circuit board PCB2, and the flat cable structure FS1'.

In the embodiment, the flat cable structures FS1'-FS6' may be FFC components, but the disclosure is not limited thereto.

In some embodiments, the implementation patterns of the second electronic panel 310, the signal drivers 120_1'-120_6', and the circuit board PCB2 may be implemented as one of the implementation patterns of FIG. 3, FIG. 5, and FIG. 9.

Figure 8:
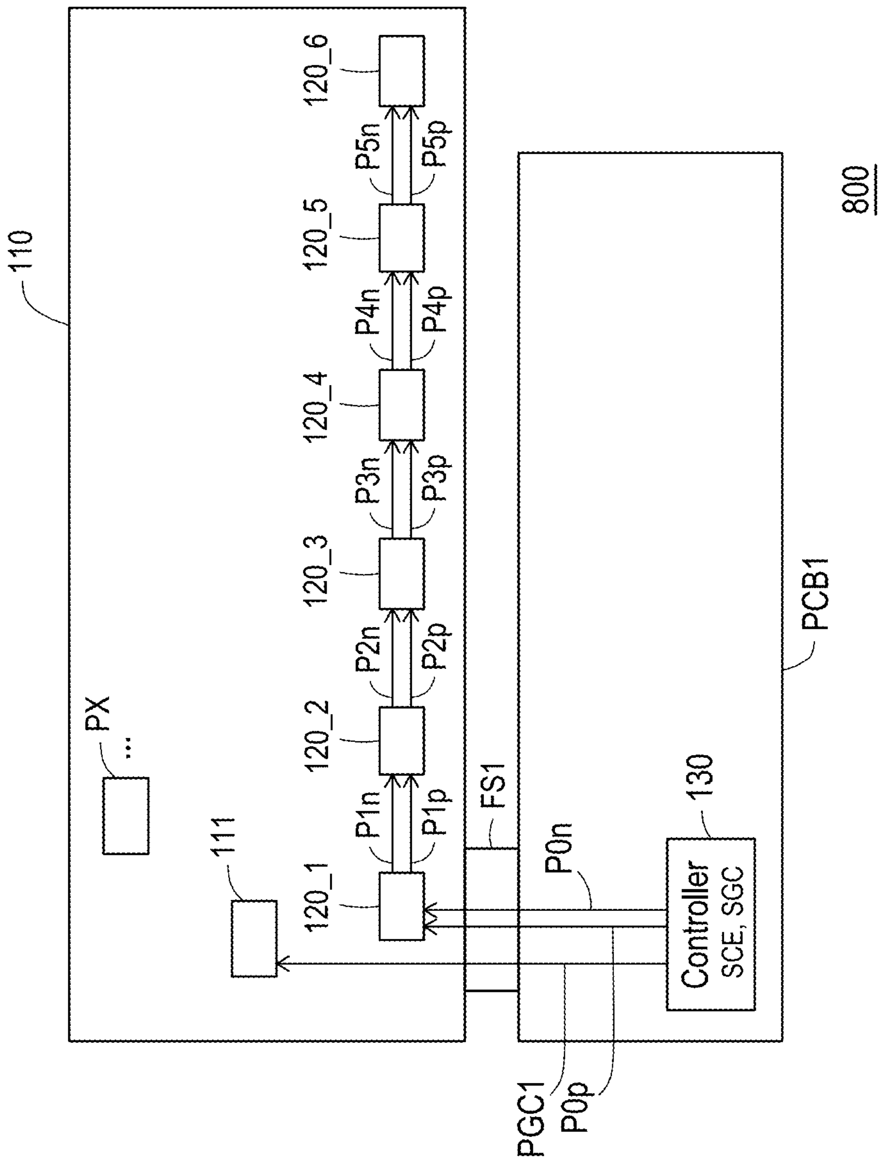
FIG. 8 is a schematic diagram of an electronic device according to an embodiment of the disclosure.

Referring to FIG. 8, FIG. 8 is a schematic diagram of an electronic device according to an embodiment of the disclosure. In the embodiment, an electronic device 800 includes the first electronic panel 110, the signal drivers 120_1-120_6, and the controller 130. The controller 130 is disposed on the circuit board PCB1. The signal drivers 120_1-120_6 are disposed on the first electronic panel 110. Two adjacent ones of the signal drivers 120_1 to 120_6 are electrically connected to each other through the traces on the first electronic panel 110.

In the embodiment, the circuit board PCB1 includes the traces P0*n*, P0*p*, and PGC1. The first electronic panel 110 includes the traces P1*n*-P5*n*, P1*p*-P5*p*, PGC1, the plurality of pixels PX, and the gate driver 111. The controller 130 is electrically connected to the signal driver 120_1 through the traces P0*n*, P0*p* and the flat cable structure FS1, and provides the clock embedded digital signal SCE to the signal driver 120_1 through the traces P0*n*, P0*p* and the flat cable structure FS1. Two adjacent ones of the signal drivers 120_1 to 120_6 are electrically connected through differential trace pairs. The signal driver 120_1 transmits the clock embedded digital signal SCE to the signal driver 120_2 through the traces P1*n* and P1*p*. The signal driver 120_2 transmits the clock embedded digital signal SCE to the signal driver 120_3 through the traces P2*n* and P2*p*, and so on.

In the embodiment, the controller 130 provides the gate control signal SGC to the gate driver 111 through the trace PGC1 and the flat cable structure FS1.

Referring to FIG. 9, FIG. 9 is a schematic diagram of an electronic device according to an embodiment of the disclosure. In the embodiment, an electronic device 900 is a splicing device. The electronic device 900 includes the first electronic panel 110, the second electronic panel 310, the signal drivers 120_1-120_6, 120_1'-120_6', the controller 130, and the circuit boards PCB1 and PCB2. The first electronic panel 110, the signal drivers 120_1 to 120_6, the controller 130 and the implementation methods thereof have been clearly explained in the embodiment of FIG. 8, so that details thereof are not repeated here.

In the embodiment, the circuit board PCB1 is electrically connected to the circuit board PCB2 through the signal transmission interface CI. The signal driver 120_6 transmits the clock embedded digital signal SCE to the circuit board PCB2 through the flat cable structure FS6, the circuit board PCB1 and the signal transmission interface CI. In addition, the controller 130 transmits the gate control signal SGC to the circuit board PCB2 through the circuit board PCB1 and the signal transmission interface CI.

In the embodiment, the signal drivers 120_1'-120_6' are disposed on the second electronic panel 310. The signal driver 120_1 is electrically connected to the circuit board PCB2 through the flat cable structure FS1'. The circuit board PCB2 includes traces P0*n*', P0*p*', and PGC'. The second electronic panel 310 includes traces P1*n*'-P5*n*', P1*p*'-P5*p*', a plurality of pixels PX' and the gate driver 111'. The signal driver 120_6 is electrically connected to the signal driver 120_1' through the flat cable structure FS6, the traces P6*n* and P6*p* of the circuit board PCB1, the signal transmission interface CI, the traces P0*n*' and P0*p*' of the circuit board PCB2, and the flat cable structure FS1'. The signal driver 120_6 provides the clock embedded digital signal SCE to the signal driver 120_1' through the flat cable structure FS2, the traces P6*n* and P6*p* of the circuit board PCB1, the signal transmission interface CI, the traces P0*n*' and POP' of the circuit board PCB2 and the flat cable structure FS1'. The signal driver 120_1' transmits the clock embedded digital signal SCE to the signal driver 120_2' through the traces P1*n*' and P1*p*'. The signal driver 120_2' transmits the clock embedded digital signal SCE to the signal driver 120_3' through the traces P2*n*' and P2*p*', and so on.

The controller 130 provides the gate control signal SGC to the gate driver 111' through the trace PGC2 of the circuit board PCB1, the signal transmission interface CI, the trace PGC' of the circuit board PCB2, and the flat cable structure FS1'.

In some embodiments, the implementation patterns of the second electronic panel 310, the signal drivers 120_1' to 120_6', and the circuit board PCB2 may be implemented as one of the implementation patterns of FIG. 3, FIG. 5, and FIG. 7.

Figure 10:
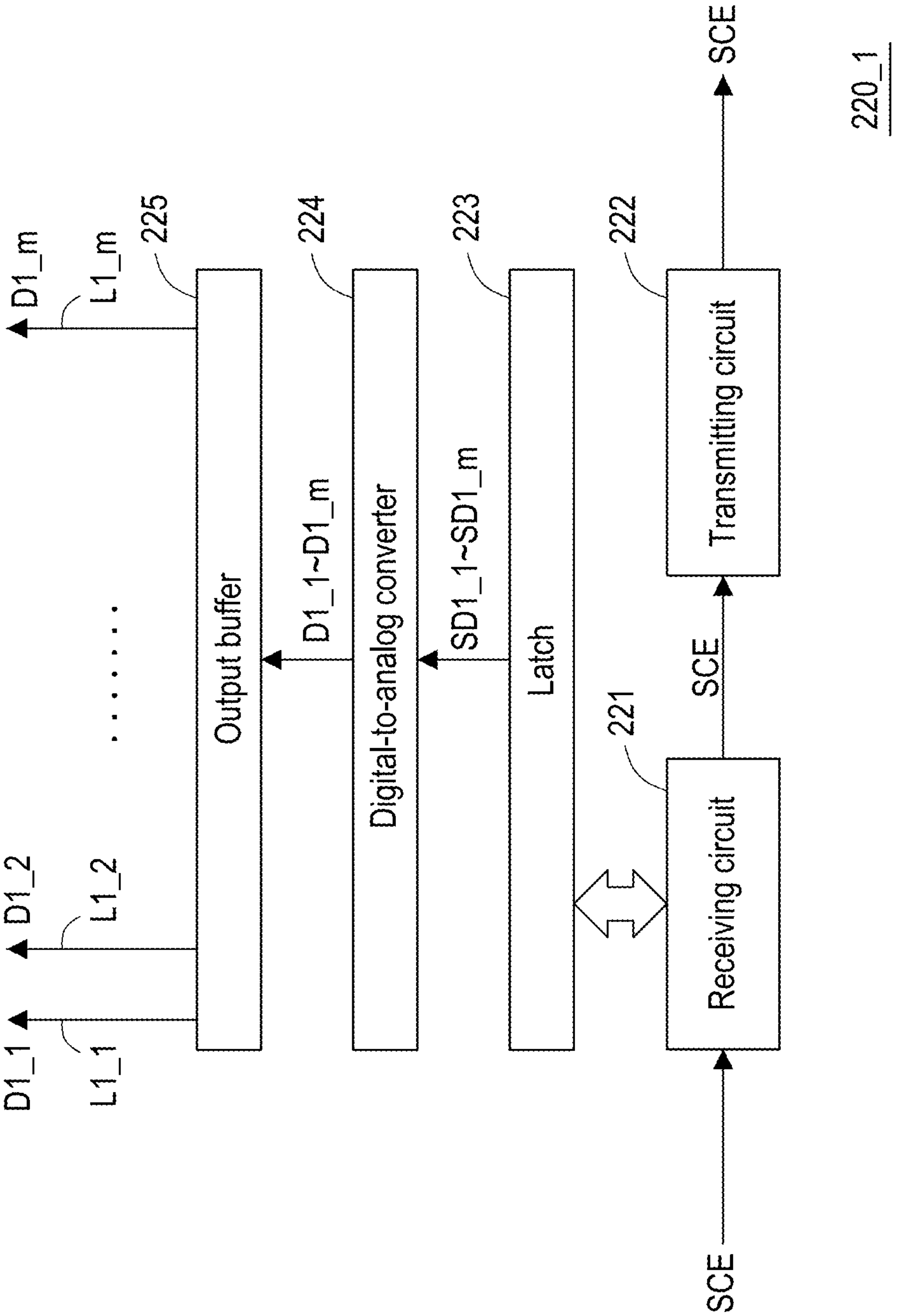
FIG. 10 is a schematic diagram of a signal driver according to an embodiment of the disclosure.

Referring to FIG. 1 and FIG. 10, FIG. 10 is a schematic diagram of a signal driver according to an embodiment of the disclosure. In the embodiment, the signal driver 220_1 is suitable to be used as the signal driver 120_1. The signal driver 220_1 includes a receiving circuit 221, a transmitting circuit 222, a latch 223, a digital-to-analog converter (DAC) 224, and an output buffer 225. The receiving circuit 221 is electrically connected to the controller 130. The receiving circuit 221 receives the clock embedded digital signal SCE provided by the controller 130. The transmitting circuit 222 is electrically connected to the receiving circuit 221 and a next-level signal driver (for example, the signal driver 120_2).

The latch 223 is electrically connected to the receiving circuit 221. The latch 223 receives the clock embedded digital signal SCE through the receiving circuit 221. In the embodiment, the clock embedded digital signal SCE includes data signals SD1_1-SD1_*m* and a point-to-point communication protocol. The latch 223 receives the data signals SD1_1-SD1_*m* according to the point-to-point communication protocol. The data signals SD1_1-SD1_*m* are respectively digital signals. After receiving the data signals SD1_1-SD1_*m*, the latch 223 notifies the receiving circuit 221 to provide the clock embedded digital signal SCE to the transmitting circuit 222. Therefore, the transmitting circuit 222 transmits the clock embedded digital signal SCE to the next-level signal driver.

In the embodiment, the DAC 224 is electrically connected to the latch 223. The DAC 224 receives the data signals SD1_1-SD1_*m*. The DAC 224 converts the data signals SD1_1-SD1_*m* into data driving signals D1_1-D1_*m*. The data driving signals D1_1-D1_*m* are respectively analog signals. The data driving signals D1_1-D1_*m* may be respectively a voltage signal, a current signal, a pulse width modulation (PWM) signal or a pulse amplitude modulation (PAM) signal. The output buffer 225 is electrically connected to the DAC 224. The output buffer 225 receives the data driving signals D1_1-D1_*m*, and provides the data driving signals D1_1-D1_*m* to the signal line group LG1. For example, the output buffer 225 provides the data driving signal D1_1 to the signal line L1_1. The output buffer 225 provides the data driving signal D1_2 to the signal line L1_2, and so on.

In addition, the circuit design of the signal drivers 120_2-120_6 of FIG. 1 and the signal drivers 120_1-120_6 and 120_1'-120_6' of FIG. 2 to FIG. 9 may be similar to the signal driver 120_1 of the embodiment.

In summary, the controller transmits the clock embedded digital signal to the first-level signal driver. In addition, the clock embedded digital signal is sequentially transmitted from the first-level signal driver to the last-level signal driver through point-to-point connections. It should be noted that the controller does not need to send a driving signal to each of the plurality of signal drivers. Therefore, a number of ports of the controller does not need to increase as the number of the signal drivers increases. Therefore, the cost of the controller is reduced.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An electronic device, comprising:

a first electronic panel, comprising a plurality of signal lines, wherein the plurality of signal lines are divided into a plurality of signal line groups, the first electronic panel further comprising a pixel disposed on a first surface of the first electronic panel;

a plurality of first signal drivers, electrically connected to the plurality of signal line groups respectively, wherein two adjacent ones of the plurality of first signal drivers are electrically connected to each other; and a controller, disposed on a circuit board, electrically connected to a first-level signal driver in the plurality of first signal drivers, and configured to transmit a clock embedded digital signal to the first-level signal driver, wherein the plurality of first signal drivers use point-to-point connection to sequentially transmit the clock embedded digital signal from the first-level signal driver to an $N^{th}$-level signal driver in the plurality of first signal drivers in a cascade manner, wherein N is greater than 1, wherein the plurality of first signal drivers are electrically connected to the circuit board through chip-on-film packaging, and the two adjacent ones of the plurality of first signal drivers are electrically connected to each other through traces on the circuit board, and wherein the plurality of first signal drivers are electrically connected between a second surface of the first electronic panel and the circuit board through the chip-on-film packaging.

2. The electronic device as claimed in claim 1, wherein the clock embedded digital signal is a differential signal.

3. The electronic device as claimed in claim 1, wherein the first electronic panel further comprises:

a gate driver, wherein the controller further transmits a gate control signal to the gate driver.

4. The electronic device as claimed in claim 3, wherein the controller is disposed on a circuit board, and the controller is electrically connected to the gate driver and the first-level signal driver through a flat cable structure and traces on the circuit board.

5. The electronic device as claimed in claim 1, wherein the controller is disposed on a circuit board, the plurality of first signal drivers are electrically connected to the circuit board through chip-on-film packaging, and the two adjacent ones of the plurality of first signal drivers are electrically connected to each other through traces on the first electronic panel.

6. The electronic device as claimed in claim 1, wherein the plurality of first signal drivers are disposed on the first electronic panel, the controller is disposed on a circuit board, and the two adjacent ones of the plurality of first signal drivers are electrically connected to each other through a flat cable structure and traces on the circuit board.

7. The electronic device as claimed in claim 1, wherein the plurality of first signal drivers are disposed on the first electronic panel, the controller is disposed on a circuit board, and the two adjacent ones of the plurality of first signal drivers are electrically connected to each other through traces on the first electronic panel.

8. An electronic device, comprising:

a first electronic panel, comprising a plurality of signal lines, wherein the plurality of signal lines are divided into a plurality of signal line groups;

a plurality of first signal drivers, electrically connected to the plurality of signal line groups respectively, wherein two adjacent ones of the plurality of first signal drivers are electrically connected to each other;

a controller, electrically connected to a first-level signal driver in the plurality of first signal drivers, and configured to transmit a clock embedded digital signal to the first-level signal driver, wherein the controller is disposed on the first circuit board, wherein the plurality of first signal drivers use point-to-point connection to sequentially transmit the clock embedded digital signal from the first-level signal driver to an Nth-level signal driver in the plurality of first signal drivers in a cascade manner, wherein N is greater than 1, a second electronic panel; and a second circuit board, electrically connected to the second electronic panel, wherein the first circuit board is electrically connected to the second circuit board through a signal transmission interface, and wherein the Nth-level signal driver transmits the clock embedded digital signal to the second circuit board through the circuit board and the signal transmission interface.

9. The electronic device as claimed in claim 8, wherein the controller transmits a gate control signal to the second circuit board through the circuit board and the signal transmission interface.

10. The electronic device as claimed in claim 8, further comprising:

a plurality of second signal drivers, electrically connected to the second electronic panel, and two adjacent ones of the plurality of second signal drivers are electrically connected to each other, wherein the plurality of second signal drivers are connected in the point-to-point connection to transmit the clock embedded digital signal.

11. The electronic device as claimed in claim 10, wherein a first-level signal driver in the plurality of second signal drivers receives the clock embedded digital signal through the signal transmission interface.

12. The electronic device as claimed in claim 10, wherein the plurality of second signal drivers are electrically connected to the second circuit board through chip-on-film packaging, and the two adjacent ones of the plurality of second signal drivers are electrically connected to each other through traces on the second circuit board.

13. The electronic device as claimed in claim 10, wherein the plurality of second signal drivers are electrically connected to the second circuit board through chip-on-film packaging, and the two adjacent ones of the plurality of second signal drivers are electrically connected to each other through traces on the second electronic panel.

14. The electronic device as claimed in claim 8, wherein a plurality of second signal drivers are disposed on the second electronic panel, and two adjacent ones of the plurality of second signal drivers are electrically connected to each other through a flat cable structure and traces on the second circuit board.

15. The electronic device as claimed in claim 8, wherein a plurality of second signal drivers are disposed on the second electronic panel, and two adjacent ones of the plurality of second signal drivers are electrically connected to each other through traces on the second electronic panel.

16. The electronic device as claimed in claim 8, wherein the first-level signal driver in the plurality of first signal drivers comprises:

a receiving circuit, configured to receive the clock embedded digital signal provided by the controller;

a transmitting circuit, electrically connected to the receiving circuit and a second-level signal driver in the plurality of first signal drivers; and a latch, electrically connected to the receiving circuit, and configured to receive the clock embedded digital signal through the receiving circuit, wherein after receiving a plurality of data signals of the clock embedded digital signal, the latch notifies the receiving circuit to provide the clock embedded digital signal to the transmitting circuit, and the transmitting circuit transmits the clock embedded digital signal to the second-level signal driver.

17. The electronic device as claimed in claim 16, wherein the plurality of data signals are respectively digital signals.

18. The electronic device as claimed in claim 17, wherein the first-level signal driver further comprises:

a digital-to-analog converter, electrically connected to the latch, and configured to convert the plurality of data signals into a plurality of data driving signals; and an output buffer, electrically connected to the digital-to-analog converter, and configured to receive the plurality of data driving signals, and provide the plurality of data driving signals to a first signal line group in the plurality of signal line groups.

* * * * *